(12) United States Patent
Nurmi et al.

(10) Patent No.: US 9,852,716 B2
(45) Date of Patent: Dec. 26, 2017

(54) METHOD AND APPARATUS FOR CAUSING A PORTION OF AT LEAST ONE CONTENT ITEM TO BE HIGHLIGHTED RELATIVE TO ANOTHER PORTION OF THE AT LEAST ONE CONTENT ITEM DURING MOVEMENT OF THE CONTENT ITEM

(75) Inventors: Mikko Antero Nurmi, Tampere (FI); Jouni Tapio Solismaa, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 224 days.

(21) Appl. No.: 13/160,001

(22) Filed: Jun. 14, 2011

(65) Prior Publication Data

US 2012/0320076 A1    Dec. 20, 2012

(51) Int. Cl.
| | |
|---|---|
| *G09G 5/02* | (2006.01) |
| *G09G 5/30* | (2006.01) |
| *G06F 3/0485* | (2013.01) |
| *G06F 3/0482* | (2013.01) |

(52) U.S. Cl.
CPC ............. *G09G 5/30* (2013.01); *G06F 3/0482* (2013.01); *G06F 3/0485* (2013.01); *G06F 2203/04806* (2013.01); *G09G 2320/10* (2013.01)

(58) Field of Classification Search
None
See application file for complete search history.

(56) References Cited

U.S. PATENT DOCUMENTS

| | | | |
|---|---|---|---|
| 6,366,302 B1 | 4/2002 | Crosby et al. | |
| 7,302,649 B2* | 11/2007 | Ohnishi ........................ | 715/838 |
| 7,600,192 B1* | 10/2009 | Hashimoto ........... | G06F 3/0482 |
| | | | 715/716 |
| 2005/0091596 A1 | 4/2005 | Anthony et al. | |
| 2005/0144570 A1 | 6/2005 | Loverin et al. | |
| 2006/0115922 A1* | 6/2006 | Araya et al. ..................... | 438/61 |
| 2006/0277490 A1* | 12/2006 | Sauermann ........... | G06F 3/0485 |
| | | | 715/787 |
| 2008/0104535 A1* | 5/2008 | DeLine et al. ................ | 715/785 |

(Continued)

FOREIGN PATENT DOCUMENTS

| | | |
|---|---|---|
| CN | 1258181 A | 6/2000 |
| EP | 2 169 926 A1 | 3/2010 |

OTHER PUBLICATIONS

International Search Report and Written Opinion for Application No. PCT/IB2012/052927 dated Nov. 29, 2012.

(Continued)

*Primary Examiner* — William Beutel
(74) *Attorney, Agent, or Firm* — Alston & Bird LLP (57) ABSTRACT

A method is provided for causing a display of at least one content item and for enabling movement of the at least one content item. The method also causes a portion of the at least one content item to be highlighted relative to another portion of the at least one content item while the at least one content item is being moved. The portion of the at least one content item may be highlighted in various manners including by changing the brightness of the portion, applying a graphical effect to the portion and/or causing movement of the portion, such as by zooming the portion of the at least one content item. A corresponding apparatus and computer program product are also provided.

28 Claims, 7 Drawing Sheets

(56) References Cited

U.S. PATENT DOCUMENTS

| | | | | |
|---|---|---|---|---|
| 2008/0155475 | A1* | 6/2008 | Duhig | G06F 3/0482 |
| | | | | 715/830 |
| 2008/0252593 | A1* | 10/2008 | Fukuta | G06F 3/0488 |
| | | | | 345/156 |
| 2009/0193337 | A1 | 7/2009 | Carter et al. | |
| 2009/0313267 | A1* | 12/2009 | Girgensohn et al. | 707/100 |
| 2010/0107125 | A1 | 4/2010 | Ockene et al. | |
| 2010/0185989 | A1* | 7/2010 | Shiplacoff | G06F 3/0416 |
| | | | | 715/856 |
| 2010/0251165 | A1 | 9/2010 | Williams | |
| 2011/0072492 | A1* | 3/2011 | Mohler | G06F 3/04817 |
| | | | | 726/3 |
| 2011/0191279 | A1* | 8/2011 | Kim | G06F 15/16 |
| | | | | 706/46 |
| 2011/0246942 | A1 | 10/2011 | Misawa | |
| 2011/0258582 | A1* | 10/2011 | Bang | 715/811 |
| 2012/0086650 | A1* | 4/2012 | Oiwa | G06F 3/0482 |
| | | | | 345/173 |
| 2012/0140255 | A1* | 6/2012 | Tanaka | G06F 9/445 |
| | | | | 358/1.13 |

OTHER PUBLICATIONS

Lightroon 3—Importing Photos [online] [retrieved Jan. 3, 2013]. Retrieved from the Internet: <URL: http://www.youtube.com/watch?v=XDOJFuFSeKg>. 3 pages.
Office Action for Chinese Application No. 201280035161.3 dated Jan. 26, 2015.
Extended European Search Report for Application No. 12800301.9 dated Oct. 28, 2015; 6 pages.
Office Action for CN Application No. 201280035161.3 dated Oct. 10, 2015.
Office Action for Chinese Application No. 201280035161.3 dated Apr. 7, 2016.
Notification to Grant Patent for Chinese Application No. 2012/0035161.3 dated Aug. 5, 2016, 4 pages total.
Office Action for European Application No. 12 800 301.9 dated Apr. 10, 2017.

* cited by examiner

METHOD AND APPARATUS FOR CAUSING A PORTION OF AT LEAST ONE CONTENT ITEM TO BE HIGHLIGHTED RELATIVE TO ANOTHER PORTION OF THE AT LEAST ONE CONTENT ITEM DURING MOVEMENT OF THE CONTENT ITEM

TECHNOLOGICAL FIELD

Some example embodiments of the present invention relate generally to user interface technology and, more particularly, relate to a method and apparatus for causing a portion of at least one content item to be highlighted relative to another portion of at least one content item during movement of the content item.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. As such, a mobile terminal may be able to access a substantial amount of content, such as photos or other images, music or video files, maps, text or other documents, games and the like. A substantial amount of the content that is accessible by a mobile terminal may be displayed for consideration by the user. In this regard, a plurality of photos or other images may be displayed, such as in an image grid. Similarly, thumbnails or other icons representative of music or video files may be displayed to facilitate selection of a respective file by the user.

Because of the amount of content that can be displayed, it may be difficult for a user to sort through and review the various content items in an efficient manner. Indeed, a user may have some difficulty in identifying one or more specific content items, such as the content items that have more importance to the user, from among the plurality of content items that are displayed. Thus, a user's review of the content and the selection of one or more specific content items may take more time and effort than is desired in at least some circumstances.

The difficulties associated with identifying one or more specific content items from among a larger number of content items that are concurrently displayed may be exacerbated in an instance in which the content items are being scrolled, since the content items may effectively blur together from the perspective of the user. By failing to identify a specific content item that is of interest during the scrolling of the content items, the user may similarly fail to halt the scrolling operation while the specific content item is on the display screen. As such, a user may have to iteratively scroll through the content items in a step-wise manner in an effort to locate a specific content item since the user may only be able to effectively consider the specific content items while the display is static, thereby disadvantageously increasing the time required to locate a specific content item and decreasing the efficiency of the search.

BRIEF SUMMARY

A method, apparatus and computer program product are therefore provided in accordance with an example embodi-

2 ment of the present invention in order to facilitate the identification of a portion of at least one content item while the at least one content item is being moved, such as by being scrolled, zoomed or the like. For example, the method, apparatus and computer program may highlight a subset of a plurality of content items while the content items are being moved so as to direct the user's attention to the highlighted content items from amongst the plurality of content items being displayed. Accordingly, the user's review of a plurality of content items may be accomplished in a more timely and efficient manner by focusing the user's attention upon a subset of the content items that may be, for example, of more import to the user than others of the content items. Indeed, by highlighting the subset of content items while the content items are being moved, the user's attention may be drawn to the respective content items that might otherwise be somewhat indistinguishable while the content items are being moved. Thus, a user may be able halt the movement of the content items in an instance in which one of the highlighted content items is identified by the user to be of further interest.

BRIEF DESCRIPTION OF THE SEVERAL VIEWS OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

A method, apparatus and computer program product are provided according to an example embodiment of the present invention for causing a portion of at least one content item to be highlighted relative to another portion of the at least one content item while the at least one content item is being moved, such as by being scrolled, zoomed or the like. In an example embodiment in which a plurality of content items are displayed, a subset of the plurality of content items may be highlighted relative to the other content items while the content items are being moved. By highlighting the subset of the plurality of content items, the user's attention may be more quickly drawn to those content items, thereby facilitating the user's identification and selection of a respective one of the highlighted content items. In one example embodiment, the content items that are highlighted may be content items that have been determined to be of more importance and, therefore, more likely to be of interest to the user. By permitting a user to more readily identify a subset of the content items during movement of the content items, the user may be able to identify a content item of interest while the content items are being moved such that the user may then halt the movement of the content items in order to further consider the respective content item. Accordingly, the method, apparatus and computer program product of an example embodiment of the present invention facilitates the search of content items during movement of the content items by reducing the time and increasing the efficiency with which a user may identify a highlighted content item from among the plurality of content items that are being moved across the display screen.

Figure 1:
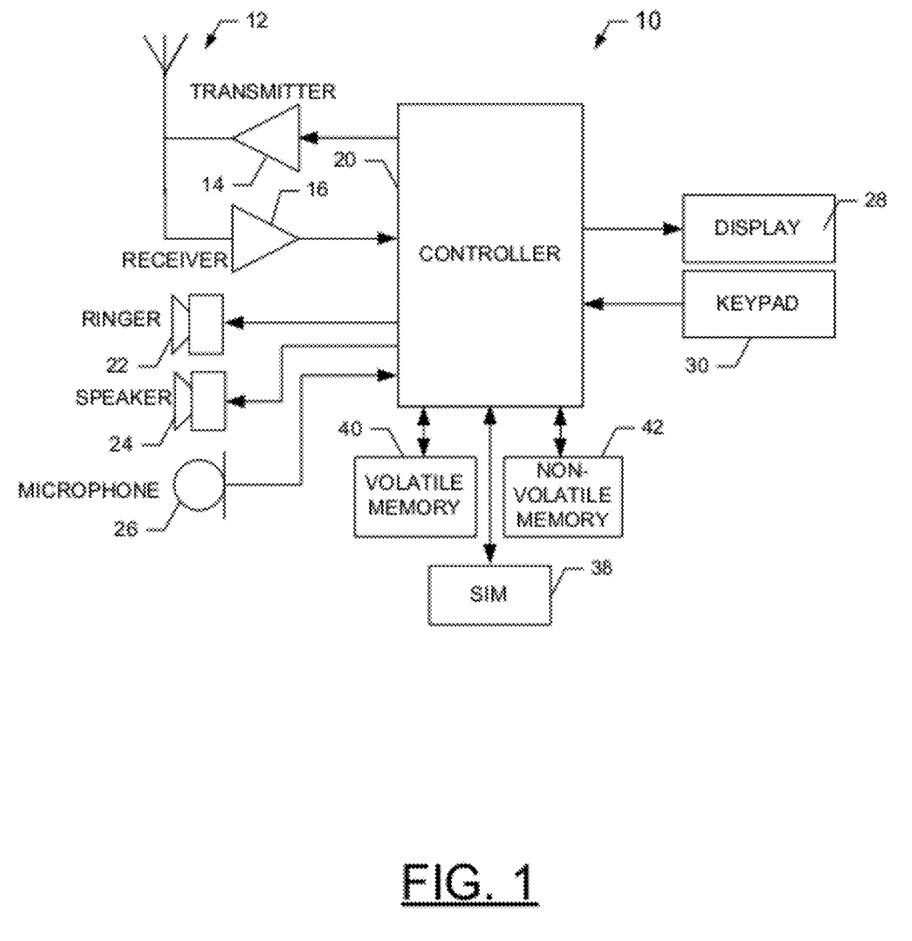
FIG. 1 is a schematic block diagram of a mobile terminal according to an example embodiment of the present invention.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for causing a subset of content items to be highlighted relative to other content items during movement of the content items are depicted. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
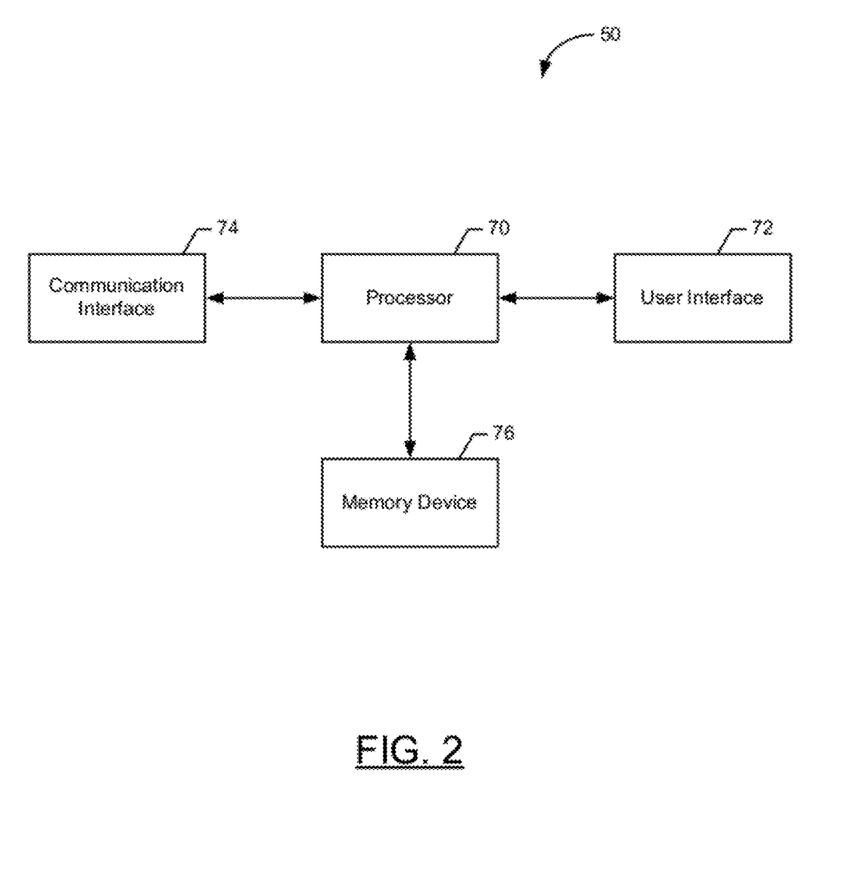
FIG. 2 is a schematic block diagram of an apparatus for causing a portion of at least one content item to be highlighted relative to another portion of the at least one content item during scrolling according to an example embodiment of the present invention.

It should also be noted that while FIG. 2 illustrates one example of a configuration of an apparatus for causing a subset of content items to be highlighted relative to other content items during movement of the content items, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for causing a subset of content items to be highlighted relative to other content items during movement of the content items is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or other computing device), such as processor 20 of mobile terminal 10 of FIG. 1, adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to cause provision of an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

Figure 3:
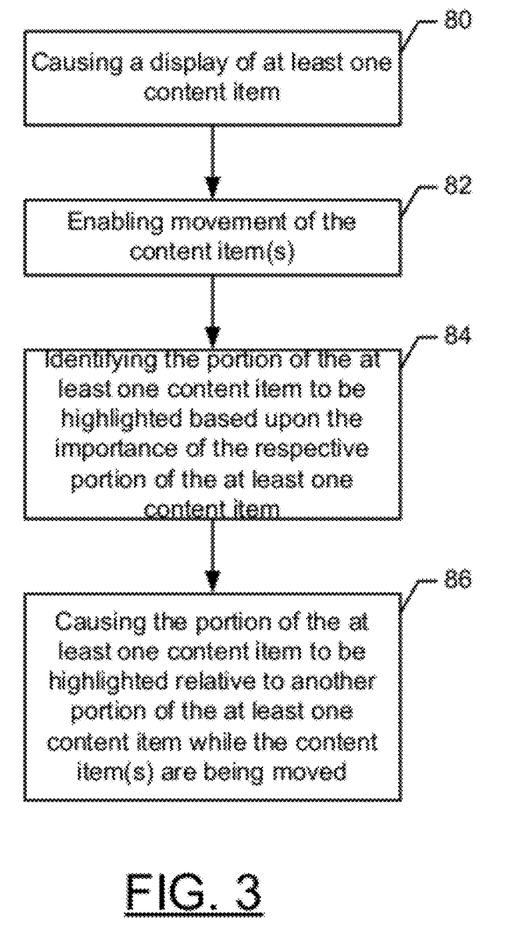
FIG. 3 is a flowchart illustrating operations performed according to an example embodiment of the present invention.
Figure 4:
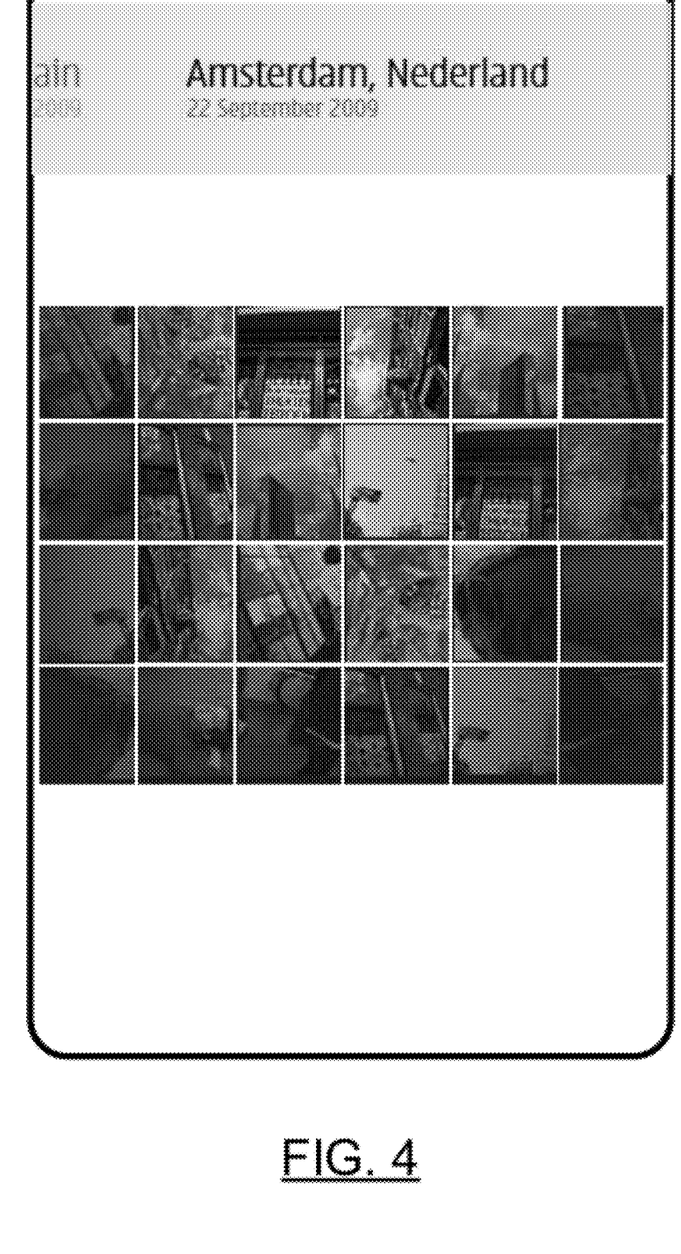
FIGS. 4-7 illustrate a plurality of screen displays of content items that may be presented when operating according to an example embodiment of the present invention.

Referring now to FIG. 3, the operations performed by an apparatus 50 in accordance with one example embodiment of the present invention are shown. In this regard, the apparatus may include means, such as the processor 70, the user interface 72 or the like, for causing the display of at least one content item, such as a plurality of content items. See operation 80 of FIG. 3. The apparatus 50 may be configured to display a wide variety of content. One example of the display of content is shown in FIG. 4. In this embodiment, the content includes the plurality of photographs or other images that are arranged and displayed in a grid-like manner. Other types of content items that may be displayed include thumbnails or other icons representative of music files, video files, games, documents, applications or the like. Alternatively, the content items may include a plurality of e-mail messages. While a plurality of content items may be displayed as shown in FIG. 4, a single content item, such as a map, may be displayed in accordance with other embodiments.

As shown in operation 82 of FIG. 3, the apparatus 50 of one embodiment includes means, such as the processor 70 or the like, for enabling movement of the content item(s). The content item(s) may be moved in various manners. For example, the content items may be zoomed, scrolled or the like. With respect to a scrolling movement, for example, the content items may be scrolled in an upward direction, a downward direction, a rightward direction, a leftward direction or in any other direction relative to the user interface 72. The apparatus 50 may be configured to receive different types of user input to direct the scrolling operation. For example, the user interface 72 may include a scroll bar that may be selected by the user. The user may then provide input indicating the direction in which the content items should be scrolled, such as by dragging a handle along the scroll bar. Alternatively, the user may utilize a mouse or a touchpad to place a cursor on the content that has been displayed and may then select the content, such as by depressing a button on or associated with the mouse or touchpad. Following selection of the content in this embodiment, the content may be scrolled, such as by dragging the cursor in a desired scrolling direction, such as while continuing to depress the button on or associated with the mouse or touchpad. Still further, the user interface 72 may include a touch screen such that a user may simply touch the portion of touch screen upon which the content is displayed in order to select the content and may then drag their finger in the desired scrolling direction to effectuate scrolling in the same direction.

The apparatus 50 also includes means, such as the processor 70 or the like, for causing a portion of the at least one content item to be highlighted relative to another portion of the at least one content item. See operation 86 of FIG. 3. In the embodiment in which a plurality of content items are displayed, a subset of the plurality of content items may be highlighted relative to others of the plurality of items while the content items are being moved. By highlighting the subset of content items during movement of the content items, the user may more readily focus upon the highlighted content items even as the content items are being moved. If any one or more of the content items, such as the highlighted content items, are of interest to the user, the user may indicate that the movement of the content items is to be ceased such that the user can further consider the content item of interest, such as by reviewing the content item in more detail or by opening or otherwise accessing the content item.

The subset of the plurality of content items includes at least one content item, but less than all of the content items. As such, at least one or more of the plurality of content items are not included within the subset and are therefore not highlighted, at least not in the same manner as the subset of the plurality of content items. In the illustrated embodiments described below, the subset of the plurality of content items is a minority and, more particularly, a distinct minority of the plurality of content items. However, the subset of the plurality of content items may include any number of content items that is less than the total number of content items.

Figure 5:
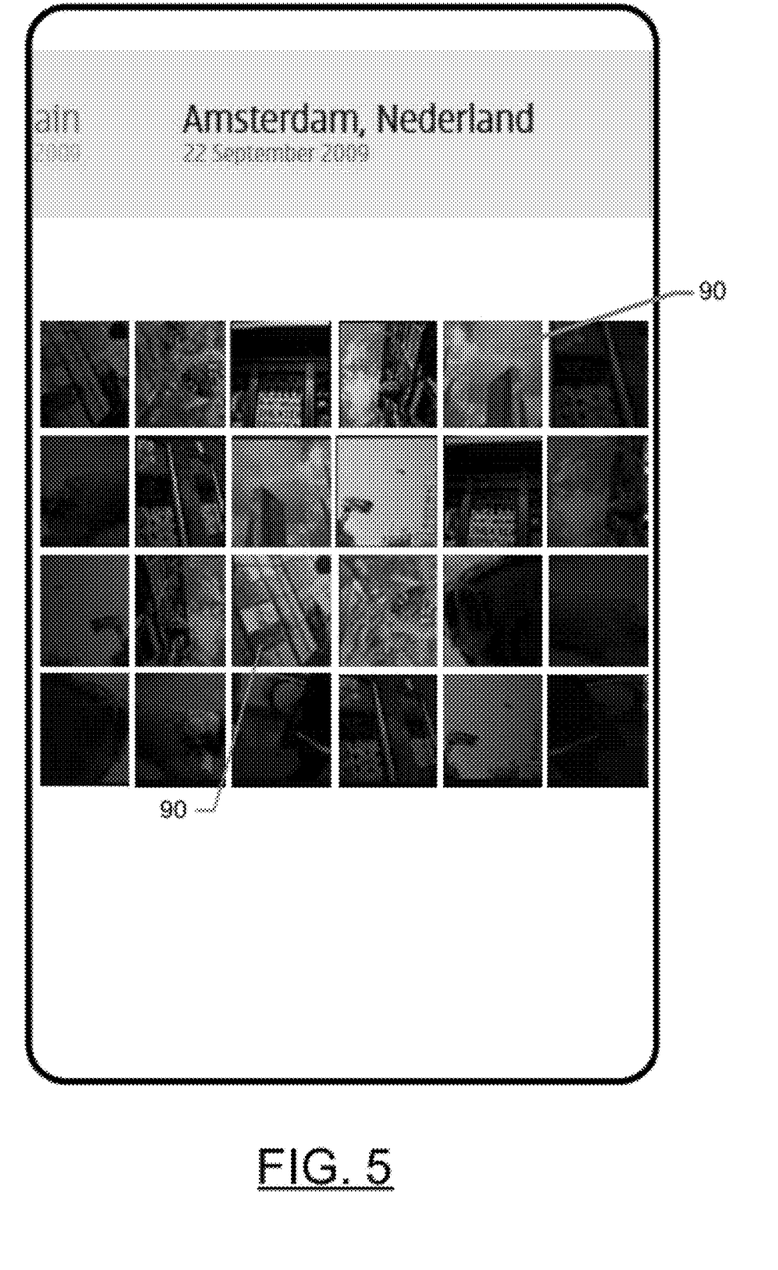

As shown in the example embodiment of FIG. 4, the plurality of content items, such as a plurality of photographs, are displayed in a grid-like manner upon a display screen. In this example, the plurality of photographs were all taken in Amsterdam on a particular day, that is, Sep. 22, 2009. As the content items are being moved, such as by being scrolled from top to bottom, left to right or the like, a subset of the plurality of content items may be highlighted as shown in FIG. 5 relative to the other content items. Although the subset of content items may be highlighted in different manners, the subset of content items are highlighted in the embodiment of FIG. 5 by changing the brightness of the subset of content items relative to the other content items. Indeed, the brightness of the subset of content items that are highlighted in the embodiment of FIG. 5 is increased relative to the other content items. As such, the subset of content items is more readily identifiable against the backdrop of the other content items during movement of the content items.

In highlighting the subset of content items, the apparatus 50, such as the processor 70, may alter the manner in which the subset of content items are displayed so as to highlight the subset of content items, but may leave the other content items unchanged or unaffected. Alternatively, the apparatus 50, such as the processor 70, may correspondingly alter the manner in which the other content items are displayed, albeit in an opposite manner to that in which the subset of content items is highlighted. In the embodiment of FIG. 5, for example, the brightness of the subset of content items is not only increased, but the brightness of the other content items is decreased, such as by dimming the manner in which the other content items are displayed. As such, the subset of content items is further highlighted in this example embodiment. In a further embodiment, other content items may be eliminated from the display such that only the subset of content items is displayed, thereby effectively highlighting the subset of content items.

Figure 6:
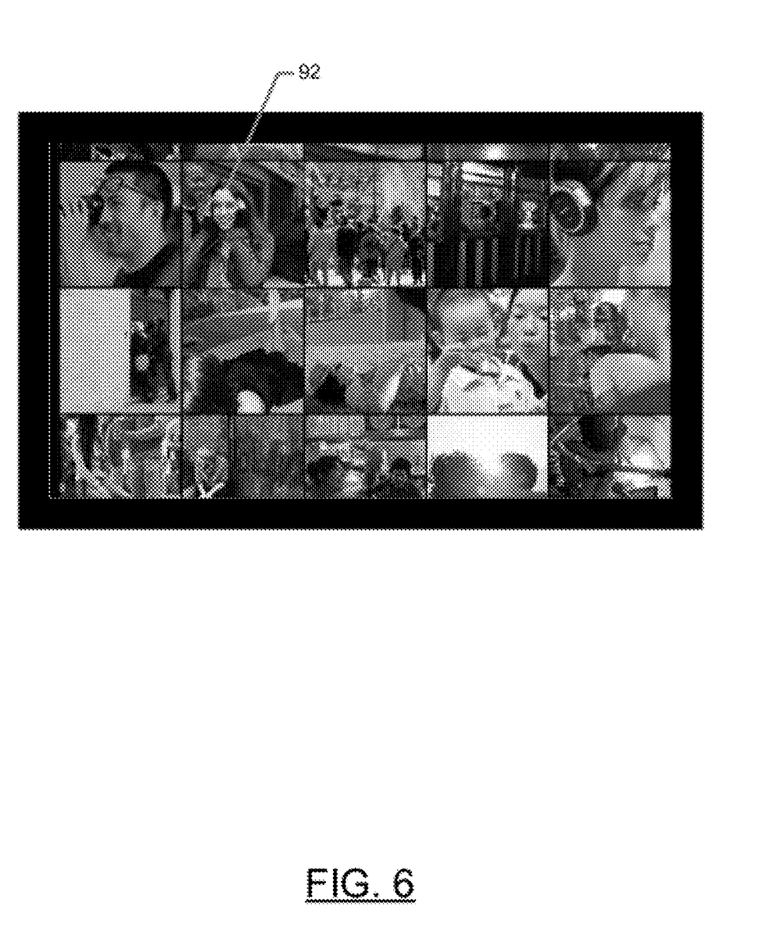
Figure 7:
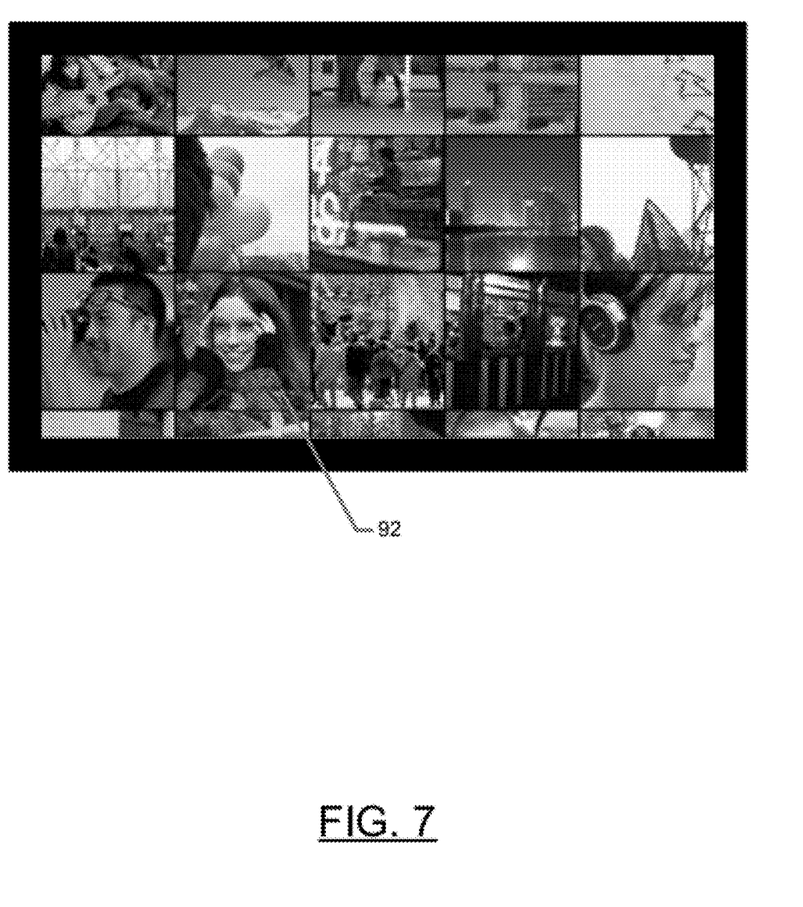

The subset of content items may be highlighted in a variety of manners in addition to or other than highlighting occasioned by changes in the relative brightness of the content items. For example, FIG. 6 illustrates another display of a plurality of content items, such as a plurality of photographs. As the plurality of content items are scrolled in this example embodiment, such as in a downward direction, the subset of the plurality of content items may be highlighted by the apparatus 50, such as the processor 70, by causing movement by or within the subset of content items. While various types of movement may be provided in order to highlight the subset of content items, the embodiment of FIG. 7 illustrates the movement of the subset of content items to be zooming of the subset of content items relative to the other content items, thereby highlighting the subset of content items. As shown in the embodiment of FIG. 7, for example, content item 92 is zoomed as the content items are scrolled from the initial display of FIG. 6 in the downward direction to a subsequent display shown in FIG. 7. Since the other content items are not zoomed during the scrolling operation, the zooming of the subset of content items effectively highlights the subset of content items. In contrast to the embodiment of FIGS. 4 and 5 in which the other content items are dimmed during the scrolling process to further accentuate or highlight the subset of content items, the other content items of the embodiment of FIGS. 6 and 7 remain the same during the scrolling process with the highlighting being provided solely by the movement, that is, the zooming, of the subset of content items. The subset of content items may be zoomed in various manners, but may be zoomed in one embodiment to a portion of the context item that is considered important, such as the face of a person or the like.

The apparatus 50, such as the processor 70 or the like, may cause the subset of content items be highlighted in other manners. For example, the apparatus 50, such as the processor, may cause the subset of content items to be highlighted by applying a graphical affect to the subset of content items. While a variety graphical affects may be applied to the subset of content items, the subset of content items are highlighted in an example embodiment by fanning or otherwise incrementally advancing a region of increased brightness across the content items such that it appears that a light beam is fanned or otherwise passed across the content items in an analogous manner to that in which a search light or spot light that moves across a sign or storefront serves to highlight and draw attention to the sign or storefront. Other forms of highlighting include, for example, a drop shadow, a dynamic border, etc. Additionally, the apparatus, such as the processor, may cause two or more subsets of content items to be highlighted in different manners. For example, one subset of content items that is considered the most important may be highlighted in one manner, a second subset of content items that is considered of medium importance may be highlighted in a second manner and a third subset of content items that is considered of lesser importance may be highlighted in a third manner. Furthermore, with a subset of content items, the apparatus, such as the processor, may cause the content items to be differently highlighted. For example, a subset of content items may include some that were previously marked as a favorite and others that were not designated as a favorite. As such, the content items within the subset that are marked as a favorite may be highlighted in a different manner than the other content items, even though all of the content items of the subset are highlighted in some fashion.

While the highlighting of the subset of content items may be begun concurrent with the commencement of the movement of the content items, the highlighting of a subset of content items may continue in one example embodiment following completion of the movement of the content items or may be discontinued or eliminated in another example embodiment upon completion of the movement of the content items. In the embodiment in which the highlighting of the subset of content items continues following completion of the movement of the content items, the subset of content items may be highlighted in the same manner following the completion of the movement of the content items as during the movement of the content items or the subset of content items may be highlighted in a different manner, such as by increasing the brightness of the subset of content items relative to the other content items following completing of the movement of the content items, but not to the same degree as during the movement of the content items. Thus, the subset of content items may still be highlighted in this example embodiment following completion of the movement of the content items, but not to the same degree as during the movement of the content items since additional highlighting may be desirable while the content items are being moved since it may be more difficult to individually focus upon the content items while the content items are being moved than following completion of the movement of the content items. In one embodiment, the highlighting of the content items that remains following completion of the movement of the content items may fade over time. In this regard, the apparatus, such as the processor, may determine if the highlighting is to remain or is fade over time depending upon the manner in which the movement was ended. For example in which the movement of the content items is a scrolling operation, the ending of the scroll by user input may cause the highlighting of the content items to be treated in one fashion, while ending of the scroll based upon inertia without specific user input may cause the highlighting of the content to be treated in the other fashion. Alternatively, in the example embodiment in which the highlighting of the subset of content items is eliminated following completion of the movement of the content items, the content items may then be displayed in a comparable manner to that in which the content items were originally displayed, such as shown in FIGS. 4 and 6 in which there is no distinction or highlighting between any of the content items. As to the timing of the highlighting of the content items, the highlighting of the subset of content items may be caused simultaneously, or may initially commence for those content items of the subset that are presented in a predefined portion of the display with the other content items of the subset being subsequently highlighted.

The subset of content items that are highlighted during the movement of the content items may be selected or identified in various manners. In one example embodiment illustrated by optional operation 84 of FIG. 3, the apparatus 50 may include means, such as the processor 70 or the like, for identifying the subset of the plurality of content items to be highlighted based upon the importance of the respective content items. The importance of the content items and consequently the highlighting of the content items is dynamic and may change, for example, based on the context of the device, user and/or surroundings. For example, the apparatus 50, such as the processor 70, may identify the importance of the content items in various manners including basing the determination of importance upon one or more of usage data, context data, historical data, social relation data, location data, etc. In regards to usage data, the apparatus 50, such as the processor 70, may identify a subset of content items to be important and therefore to be included within the subset of content items that will be highlighted during movement of the content items based upon the recency with which the content items have been accessed, such as by identifying all content items that have been accessed within a predefined time period, such as within the past day, to be important. Alternatively, the apparatus 50, such as the processor 70, may identify a subset of content items to be important and therefore to be included within the subset of content items that will be highlighted during movement of the content items based upon the quantity of usage, such as by identifying those content items that have been used the most often over a predefined period of time, such a over the past week or month, to be most important.

In terms of context data, the apparatus 50, such as the processor 70, may determine the current context of the apparatus, such as by determining the location of the apparatus, the mode of travel of the apparatus, the application(s) currently executing upon the apparatus or the like. It may then identify the subset of content items that have the same or a comparable context. In an embodiment in which the content items are photographs, the apparatus 50, such as the processor 70, may determine which, if any, photographs were taken in the same location as that in which the apparatus is currently located. While the context of the content items may be identified by image recognition or the like, the context of the content items may be identified by meta data that is associated with each of the content items and that may be reviewed by the apparatus 50, such as the processor 70, in order to determine if the context of one or more of the content items is sufficiently similar, such as by being within a predefined threshold of, the current context of the apparatus 50. The content items that are determined to have a sufficiently similar context as the apparatus may then be included within the subset of content items that are highlighted during movement of the content items.

In terms of historical data, the apparatus 50, such as the processor 70, may rely upon various types of historical data in order to determine the relative importance of the content items that, in turn, defines the content items to be included within the subset that is highlighted. For example, the apparatus 50, such as the processor 70, may determine the content items that have been highlighted during prior movement of the content items, such as a prior scrolling operations, or that have been previously selected or otherwise accessed by the user and may include these content items within the subset of content items that are highlighted during the next movement of the content items. Still further and with respect to the social relation data, the apparatus 50, such as the processor 70, may identify the content items that bear a predefined social relationship to the user of the apparatus 50. With respect to photographs or other images, for example, the apparatus 50, such as the processor 70, may identify those content items that include a particular person or a particular building, landmark, object or the like. In this regard, the photographs or other images may be analyzed by image recognition or other techniques in order to identify the person, building, landmark or the like that is of interest. Alternatively, the meta data associated with the content items may identify any person, building or other landmark within the image. The content items that include a person, building, landmark or the like of interest may be included within the subset of content items that is then highlighted during the subsequent movement of the content items.

The manner in which the importance of the content items is defined may be established in advance, such as by the establishment of one or more rules that define the relative importance of the content items. Alternatively, the user may provide input via the user interface 72 as to the content items that are of importance and/or the manner in which the relative importance of the content items is to be determined. For example, the user may conduct a search with the search string effectively identifying the content items of importance to be those content items that match or otherwise satisfy the search string. Additionally, the manner in which the importance of the content items is determined may depend upon the type of content item under consideration. For example, the importance of e-mail messages may be based upon to-do or other flags, unread status, high importance status and the like.

By highlighting a subset of content items during movement of the content items, the attention of a user may be focused or directed upon the subset of content items. As such, the user may be more likely to identify a particular one of the highlighted content items while the content items are being moved to be of potential interest. As such, a user may cause the movement of the content items to be halted while the content item of interest remains on the screen for further review or access by the user. Thus, the highlighting of a subset of content items during movement of the content items may facilitate the review of the content item by the user during the movement of the content items and reduce the time required for a user to identify and select a respective content item.

While the display and movement of a plurality of content items have been described above, a single content item, such as a map, may be displayed and moved in other embodiments. In this embodiment, a portion of the single content item, such as a portion of a map, may be highlighted relative to other portions of the content item while the content item is moved, such as by being scrolled. As such, the user's attention may be drawn to the highlighted portion of the content item.

As described above, FIG. 3 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   causing a display of a plurality of content items;
   enabling movement of the plurality of content items;
   causing, via a processor, a subset of the plurality of content items to be highlighted relative to others of the plurality of content items while the plurality of content items are being moved, wherein causing the subset of content items to be highlighted comprises identifying the subset of the plurality of content items to be highlighted based upon an importance of the content items with the importance of the content items being dependent upon at least one of: (i) context data relating to a location of an apparatus upon which the content items are displayed or a mode of travel, (ii) historical data relating to prior highlighting of the content items or (iii) social relation data, wherein causing the subset of content items to be highlighted comprises beginning highlighting of the subset of content items concurrent with commencement of the movement of the plurality of content items, and wherein causing the subset of the content items to be highlighted comprises changing a brightness of the subset of the content items relative to the other content items; and
   continuing to highlight the subset of the content items after completion of the movement by continuing to change the brightness of the subset of the content items relative to the other content items, wherein the brightness of the subset of the content items during the movement is different than the brightness of the subset of the content items after completion of the movement.

2. A method according to claim 1 wherein changing the brightness of the subset of the content items relative to the other content items by increasing the brightness of the subset of the content items relative to the other content items.

3. A method according to claim 1 wherein causing the subset of the content items to be highlighted further comprises applying a graphical effect to the subset of the content items.

4. A method according to claim 1 wherein causing the subset of the content items to be highlighted further comprises causing movement of the subset of the content items.

5. A method according to claim 4 wherein causing movement comprises zooming the subset of the content items relative to other content items.

6. A method according to claim 1 wherein identifying the subset of the plurality of content items to be highlighted comprises determining the importance of the content items in a dynamic manner based upon device context, user context or a context of the surroundings.

7. A method according to claim 1 wherein identifying the subset of the plurality of content items to be highlighted comprises determining the importance of the content items based upon a status category of the content items.

8. A method according to claim 1 wherein causing the subset of content items to be highlighted further comprises eliminating the other content items from the display while the content items are moved.

9. A method of claim 1 wherein completion of the movement by user input causes the highlighting of the content items to be treated in one manner, while completion of the movement based upon inertia without specific user input causes the highlighting of the content to be treated in a second manner.

10. A method of claim 1 further comprising determining whether highlighting of the subset of content is to remain or is to fade following completion of the movement depending upon a manner in which the movement was ended.

11. A method of claim 1 wherein the brightness of the subset of the content items after completion of the movement is greater than the brightness of the other content items, but is less than the brightness of the subset of content items during the movement.

12. An apparatus comprising at least one processor and at least one memory including computer program code, the at least one memory and the computer program code configured to, with the processor, cause the apparatus to at least:
cause a display of a plurality of content items;
enable movement of the plurality of content items;
cause a subset of the plurality of content items to be highlighted relative to others of the plurality of content items while the plurality of content items are being moved, wherein the at least one memory and the computer program code are configured to, with the processor, cause the apparatus to cause the subset of content items to be highlighted by identifying the subset of the plurality of content items to be highlighted based upon an importance of the content items with the importance of the content items being dependent upon at least one of: (i) context data relating to a location of an apparatus upon which the content items are displayed or a mode of travel, (ii) historical data relating to prior highlighting of the content items or (iii) social relation data, wherein the at least one memory and the computer program code are configured to, with the processor, cause the apparatus to cause the subset of content items to be highlighted by beginning highlighting of the subset of content items concurrent with commencement of the movement of the plurality of content items, and wherein the at least one memory and the computer program code are configured to, with the processor, cause the apparatus to cause the subset of the content items to be highlighted by changing a brightness of the subset of the content items relative to the other content items; and
continue to highlight the subset of the content items after completion of the movement by continuing to change the brightness of the subset of the content items relative to the other content items, wherein the brightness of the subset of the content items during the movement is different than the brightness of the subset of the content items after completion of the movement.

13. An apparatus according to claim 12 wherein the at least one memory and computer program code are configured to, with the at least one processor, cause the apparatus to change the brightness of the subset of content items relative to the other content items by increasing the brightness of the subset of the content items relative to the other content items.

14. An apparatus according to claim 12 wherein the at least one memory and computer program code are configured to, with the at least one processor, cause the apparatus to cause the subset of content items to be highlighted by also applying a graphical effect to the subset of content items.

15. An apparatus according to claim 12 wherein the at least one memory and computer program code are configured to, with the at least one processor, cause the apparatus to cause the subset of content items to be highlighted by also causing movement of the subset of content items.

16. An apparatus according to claim 12 wherein the at least one memory and computer program code are configured to, with the at least one processor, cause the apparatus to identify the subset of the plurality of content items to be highlighted by determining the importance of the content items in a dynamic manner based upon device context, user context or a context of the surroundings.

17. An apparatus according to claim 12 wherein the at least one memory and computer program code are configured to, with the at least one processor, cause the apparatus to identify the subset of the plurality of content items to be highlighted by determining the importance of the content items based upon a status category of the content items.

18. An apparatus according to claim 12 wherein the at least one memory and computer program code are configured to, with the at least one processor, cause the apparatus to cause the subset of content items to be highlighted by also eliminating the other content items from the display while the content items are moved.

19. An apparatus according to claim 12 wherein completion of the movement by user input causes the highlighting of the content items to he treated in one manner, while completion of the movement based upon inertia without specific user input causes the highlighting of the content to be treated in a second manner.

20. An apparatus according to claim 12 wherein the at least one memory and computer program code are further configured to, with the at least one processor, cause the apparatus to determine whether highlighting of the subset. of content is to remain or is to fade following completion of the movement depending upon a manner in which the movement was ended.

21. An apparatus according to claim 12 wherein the brightness of the subset of the content items after completion of the movement is greater than the brightness of the other content items, but is less than the brightness of the subset of content items during the movement.

22. A computer program product comprising at least one non-transitory computer-readable storage medium having computer-executable program code instructions stored therein, the computer-executable program code instructions comprising program code instructions for:
causing a display of a plurality of content items;
enabling movement of the plurality of content items;
causing a subset of the plurality of content items to be highlighted relative to others of the plurality of content items while the plurality of content items are being moved, wherein the program code instructions for causing the subset of content items to be highlighted comprise program code instructions for identifying the subset of the plurality of content items to be highlighted based upon an importance of the content items with the importance of the content items being dependent upon at least one of: (i) context data relating to a location of an apparatus upon which the content items are displayed or a mode of travel, (ii) historical data relating to prior highlighting of the content items or (iii) social relation data, wherein causing the subset of content items to be highlighted comprises beginning highlighting of the subset of content items concurrent with commencement of the movement of the plurality of content items, and wherein causing the subset of the content items to be highlighted comprises changing a brightness of the subset of the content items relative to the other content items; and continuing to highlight the subset of the content items after completion of the movement by continuing to change the brightness of the subset of the content items relative to the other content items, wherein the brightness of the subset of the content items during the movement is different than the brightness of the subset of the content items after completion of the movement.

23. A computer program product according to claim 22 wherein the computer-executable program code instructions for identifying the subset of the plurality of content items to be highlighted comprise computer-executable program code instructions for determining the importance of the content items in a dynamic manner based upon device context, user context or a context of the surroundings.

24. A computer program product according to claim 22 wherein the computer-executable program code instructions for identifying the subset of the plurality of content items to be highlighted comprise computer-executable program code instructions for determining the importance of the content items based upon a status category of the content items.

25. A computer program product according to claim 22 wherein the program code instructions for causing the subset of content items to be highlighted further comprise program code instructions for eliminating the other content items from the display while the content items are moved.

26. A computer program product according to claim 22 wherein completion of the movement by user input causes the highlighting of the content items to be treated in one manner, while completion of the movement based upon inertia without specific user input causes the highlighting of the content to be treated in a second manner.

27. A computer program product according to claim 22 wherein the computer-executable program code instructions further comprise program code instructions for determining whether highlighting of the subset of content is to remain or is to fade following completion of the movement depending upon a manner in which the movement was ended.

28. A computer program product according to claim 22 wherein the brightness of the subset of the content items after completion of the movement is greater than the brightness of the other content items, but is less than the brightness of the subset of content items during the movement.

* * * * *

UNITED STATES PATENT AND TRADEMARK OFFICE
CERTIFICATE OF CORRECTION

PATENT NO. : 9,852,716 B2
APPLICATION NO. : 13/160001
DATED : December 26, 2017
INVENTOR(S) : Nurmi et al.

It is certified that error appears in the above-identified patent and that said Letters Patent is hereby corrected as shown below:

In the Claims

Column 16,
Line 36, "content items to he treated" should read --content items to be treated--.

Signed and Sealed this
Twenty-sixth Day of June, 2018

Andrei Iancu
*Director of the United States Patent and Trademark Office*